United States Patent [19]
Cowpland

[11] 3,795,775
[45] Mar. 5, 1974

[54] DUAL TONE RECEIVER

[75] Inventor: Michael C. J. Cowpland, Ottawa, Ontario, Canada

[73] Assignee: Microsystems International, Limited, Montreal, Quebec, Canada

[22] Filed: Dec. 7, 1972

[21] Appl. No.: 313,106

[30] Foreign Application Priority Data
Oct. 16, 1972 Canada .............................. 153991

[52] U.S. Cl. ........................................... 179/84 VF
[51] Int. Cl. ......................... H04m 1/50, H04q 9/12
[58] Field of Search ................. 179/84 VF; 325/303

[56] References Cited
UNITED STATES PATENTS
3,582,562 6/1971 Sellari ........................... 179/18 AD
3,701,857 10/1972 Wsuda et al. .................. 179/84 VF
3,710,031 1/1973 Sellari ............................ 179/84 VF

*Primary Examiner*—Kathleen H. Claffey
*Assistant Examiner*—Joseph A. Popek
*Attorney, Agent, or Firm*—E. E. Pascal

[57] ABSTRACT

A dual tone receiver which provides a pair of individual output signals corresponding to the input signal frequencies of each of the received tones. The sensitivity of the receiver to each of the tones is affected by the relative amplitudes of each of the tone components of the input signal, in an inverse relationship.

14 Claims, 9 Drawing Figures

DUAL TONE RECEIVER

This invention relates to a tone receiver particularly useful for receiving and decoding the two simultaneous tones normally generated for the purpose of dialling in a push-button telephone set.

A tone receiver useful for detection of dialled tones (such as those generated by the tone generator described in Canadian patent 911,550, by M.C.J. Cowpland, issued Oct. 3, 1972) must normally detect bursts of signals of two frequencies simultaneously. These signals, as received at the switching office end of a subscriber's line can vary widely in absolute and relative levels due to attentuation during transmission. The tone receiver must also be as immune as possible to actuation by speech and noise signals, all of which can be present between, and during the tone signal bursts.

Normally, the generated tones are grouped into two groups of signal frequencies, commonly classified as low-frequency group and the high frequency group, the low-frequency group typically using signal frequencies which have been standardized at 697, 770, 852, and 941 hertz, and the high frequency group using signal frequencies standardized at 1,633, 1,477, 1,336, and 1,209 hertz. When a pushbutton is actuated at the telephone set, one tone of the low frequency group and one tone of the high frequency group are generated simultaneously, various combinations of tones standing for numbers between 0 and 9, other alphanumeric characters, or functions. The purpose of the tone receiver is to receive the combinations of tones and translate them into unipotential voltage signals of predetermined amplitude at a set of output terminals, which can then be used for operating further equipment in response to the generation of the tones.

A conventional and well known tone receiver system is described in Bell System Technical Journal, "Push-Button Calling with a Two Group Voice Frequency", by L. Schenker, January 1960, pages 1 to 21. In this system, a filter is used to separate the low and high frequency groups, following which the individual groups are hard limited in order to form them into square waves of well defined amplitude. Bandpass filters then separate each of the frequency components within the required tone bands, and the individual signals are then passed to level detectors in order to determine whether the square waves are within the proper recognition bandwidths, and in order to obtain an indication as to which frequencies are present.

In the event that two proper tone frequencies and no others are present, the receiver operates and output voltages are produced. However, if signal energy at other frequencies is also present, it effectively reduces the desired signal tone frequency components of the square waves by causing jitter, rendering the aforementioned level detectors inoperative.

Other embodiments of this prior art receiver often contain a pre-filtering circuit which is intended to remove dial tone and radio frequency noise. Some embodiments use an automatic gain control circuit ahead of the frequency group separation filter in order to reduce the dynamic range of the input signal, but the basic circuit remains the same.

Miniaturization of the tone generator is important, for instance in order to make use of the most modern production technologies such as integrated circuit and hybrid integrated circuit-thin film structures in mass production. It appears that the most expensive component to realize is the high and low frequency group separation filter, which must be of a high order, due to the closeness of the highest frequency in the low frequency group (941 hertz), and the lowest frequency in the high frequency group (1,209 hertz). In this invention, this group separation filter is eliminated, while readily and inexpensively realizable active filters are used as the single tone bandpass filters.

The present invention has been realized using solely integrated circuit and hybrid microelectronic circuitry. Instead of the aforementioned hard limiting and prefiltering, this invention uses an automatic gain control circuit and active filters. However, since the filters overlap somewhat at their extreme band edges, a novel structure and technique of detecting the presence of a signal and of providing corresponding output signals, while rejecting voice and noise signals is provided.

If the attenuation of the different tone frequencies due to transmission line variations were uniform, fixed voltage level detectors could be used following the bandpass filters to complete the receiver. However, the slope of typical telephone transmission line attenuation causes 1,633 hertz to be attenuated more than 697 hertz. Therefore, although the total amplitude of a tone burst $A_t$ may be controlled well by an automatic gain control circuit, the individual frequency components of the high band $A_h$ and of the low band $A_l$ may not be equal, and thus will only be poorly controlled. However, in this invention, the utility of a good automatic gain control circuit to cause the individual components $A_h$ plus $A_l$ to equal $A_t$, is used.

In particular, in the event the amplitude of a high frequency tone band signal is greater than that of a low frequency band signal, the sensitivity of the signal processing channel which processes the low amplitude signal, to the low amplitude signal is greatly increased, while the sensitivity of the other channel to the higher amplitude signal is decreased.

The signal level detectors are desensitized to any signals having a smaller amplitude ratio than a predetermined value, which virtually eliminates any possibility of speech or noise signals operating any one. Accordingly, since the controlled amplitude $A_t$ is the sum of all the signal energy present, if significant broadband energy is present, the component amplitude contributions at the filtered tone frequencies will not be enough to operate the detectors.

In general, then, the present invention is a tone receiver adapted to receive input signals having two different frequency tone components, comprising means for translating the received tone components into individual signals having amplitudes bearing a proportional relationship to their individual amplitude components of the input signal, trigger means connected to the translating means for receiving the individual signals corresponding to the tone components, the trigger means being adapted to produce individual output signals of predetermined amplitude upon receipt of the individual signals having amplitudes above predetermined thresholds, and threshold control means connected to the translating means and to each of the trigger means for lowering the trigger threshold of the trigger means to the amplitude of one of said individual signals upon receipt of a relatively higher amplitude other one of said individual signals, and for raising the trigger threshold of the trigger means to the amplitude of one of said individual signals upon receipt of a relatively lower amplitude other one of said individual signals.

A better understanding of this invention will be obtained by reference to the following description, and the drawings referred to below, in which.

Figure 1:
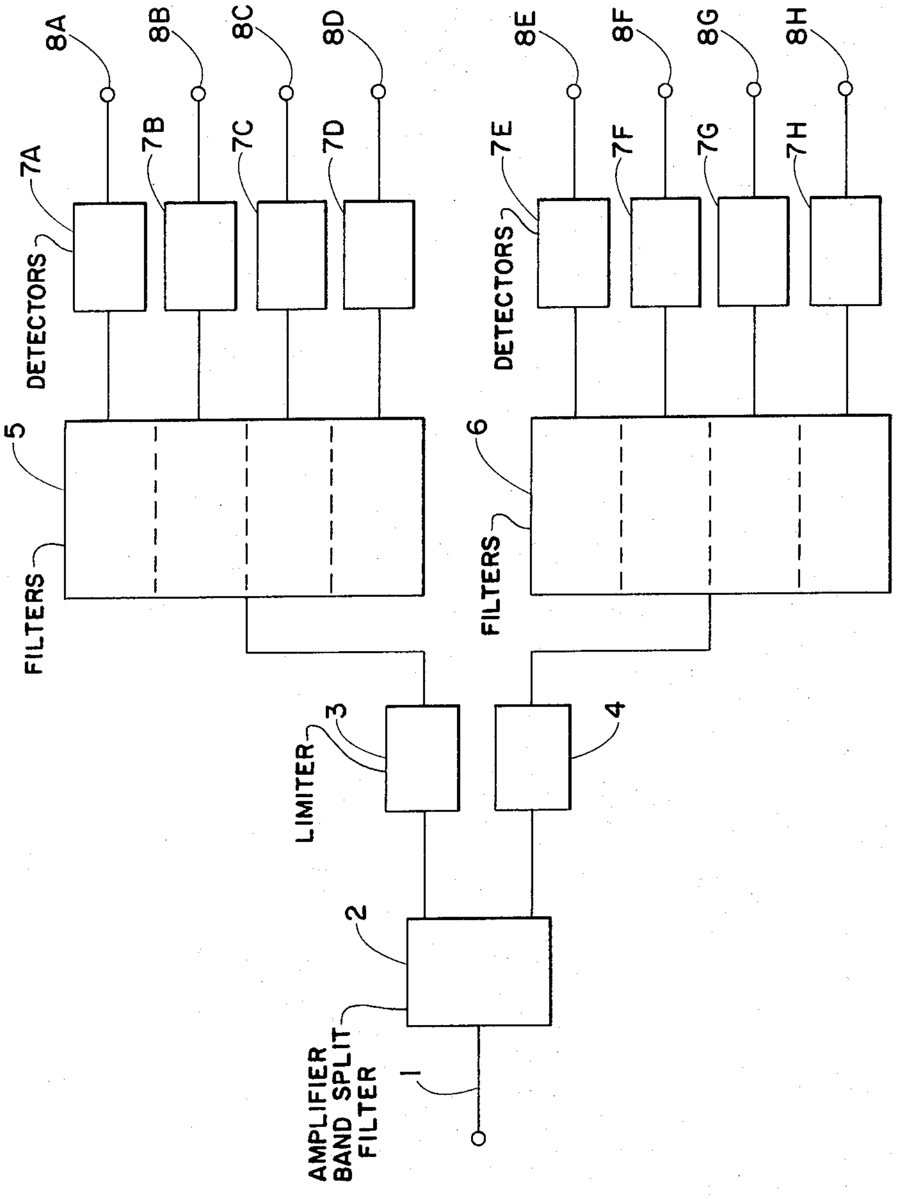
Fig. 1 PRIOR ART
FIG. 1 is a block diagram representation of a prior art circuit.
Figure 4:
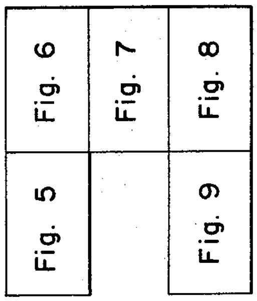

FIG. 4, appearing out of its regular order on the same sheet as FIG. 1, shows how FIGS. 5, 6, 7, 8, and 9 should be placed together;

FIGS. 5, 6, 7, 8, and 9 placed together form a schematic drawing of the present invention.

Turning now to FIG. 1, a circuit according to the prior art is shown in block diagram, which circuit is commonly used to receive dual signalling tones from a subscriber's line.

A signal comprised of two tone frequencies arrives at the receiver via a subscribers's line 1, and is fed to an input amplifier and band split filter 2. The filter separates the expected high frequency group of signals from the expected low frequency group of signals, respectively referred to below as the high band and the low band. Of the two signalling tones simultaneously received, one would appear in the high band and one would appear in the low band.

The two separated tone frequencies are then respectively fed into limiters 3 and 4, where they are hard limited to fixed amplitude levels.

In order to determine which of the frequencies are present for decoding purposes, each of the limited tone signals are then fed to banks of channel filters 5 and 6, whereupon, in the event that the required two, and only two, tone frequencies are present, signals will be passed through the appropriate pair of channel filters, to detectors 7A – 7H. Upon detection of a signal above a predetermined threshold, each actuated detector generates an output signal at two of the output terminals for actuation of further equipment.

In the event of attenuation of different tone frequencies to different levels during transmission via the incoming transmission line, limiters 3 and 4 mask the discrepancy through more severe limiting of the higher amplitude tone frequency than of the lower amplitude. As was mentioned earlier, if other than the required two tone frequencies is present, the energy effectively reduces the required tone frequency components of the square waves, causing jitter, and the detectors 7A – 7H are not operated.

It has been estimated that at the present time the typical selling price of the band split filter block 2 component is about $40. One of the reasons for the relatively high cost is its relative complexity, containing many poles and zeros in the complex impedance plane. Due to its complexity, it is difficult to trim to frequency. Accordingly, it would be most advantageous if this filter could be eliminated.

The present invention eliminates the aforementioned band splitting filter 2, and the novel structure allows use of an integrated circuit active filter for separation of each of the frequencies to be received.

Figure 2:
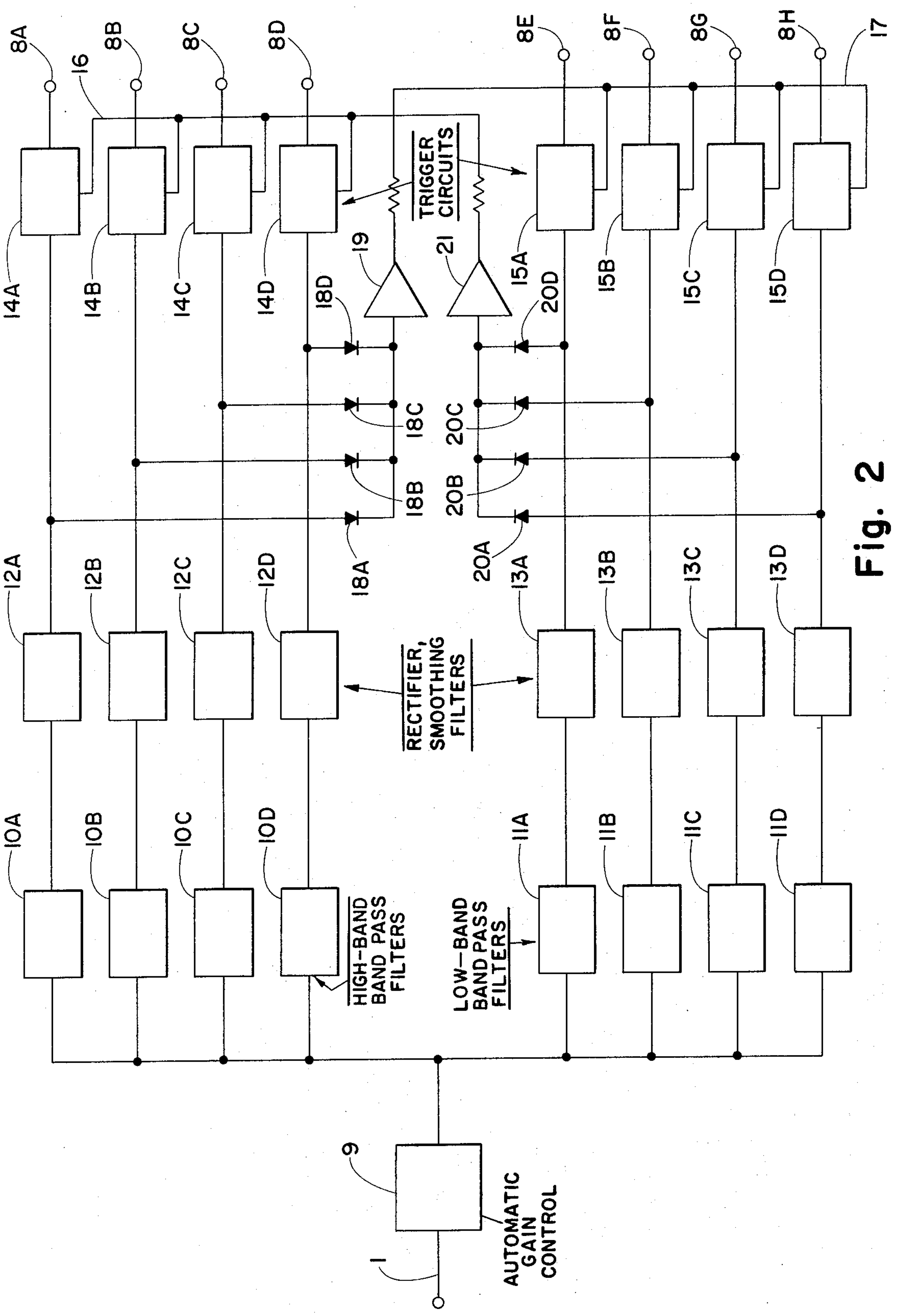
FIG. 2 is a block diagram representation of the present invention.

Let us now turn to FIG. 2 of the drawings, which shows in block diagram the system which is the subject of the present invention. A signal carrying two frequency tones arrives at the receiver via subscriber's line 1. In the event it is expected that signals arriving at the tone receiver will be of differing amplitudes, the combined signal is passed through an automatic gain control circuit 9 in order to cause any received dual tone signals to be of the same amplitude, and not to vary with time.

It should be noted that the output signal from the automatic gain control 9 will not have been clipped, and in the event the two tone frequencies are of different amplitudes due to different transmission line attenuation, their ratio of amplitudes would be maintained. This is clearly different and distinct from the characteristic of the signals about to enter the channel filters in the prior art, in which the two signal tones have been severely clipped to square waves and rendered equal in amplitude.

For the sake of example, it will be assumed that the expected tone signals are of the frequencies mentioned earlier, four in the high band and four in the low band. One bandpass filter per frequency, references 10A – 10D for the high band and references 11A – 11D for the low band, is connected to the output of the automatic gain control circuit 9. The bandpass filters each pass the alternating component of the dual tone signal within its frequency band to the next stage, maintaining the approximate relative amplitudes of the tones presented to them.

Connected to the output ports of the bandpass filters are rectifiers and smoothing filters 12A – 12D and 13A – 13D respectively. The individual signals passed by the bandpass filters are thus converted into unipotential voltages.

The resulting unipotential voltages are then passed to individual trigger circuits 14A – 14D and 15A – 15D, whereupon output signals are triggered to actuate external equipment such as logic circuitry, relays, or the like. The trigger circuits are designed to have variable triggering thresholds, which allows them to be triggered at a relatively higher amplitude input signal level upon raising of their trigger thresholds, and to be triggered at a relatively lower amplitude input signal upon lowering of their triggering thresholds. Terminals to which the high band threshold control signals are applied are connected together at conductor 16, and terminals to which the low band trigger threshold control signals are applied are connected together at conductor 17.

As mentioned earlier, the triggering thresholds of the trigger circuits for one band of frequencies are decreased in the event the triggering signal is relatively low in amplitude. Diodes 18A – 18D, connected to the rectifying and smoothing filter circuits for one frequency band provide a logical OR function; all are connected to a linear voltage amplifier 19. The voltage amplifier is connected to the common trigger threshold control terminal conductor 17 of the trigger circuits 15A to 15D for the other frequency band.

Similarly, diodes 20A – 20D are each connected to the rectifying and smoothing filters 13A – 13D of the other frequency band, and are all also connected to a second linear voltage amplifier 21, which provides, at its output, a triggering threshold voltage at the common trigger threshold terminal conductor 16 of trigger circuits 14A – 14D of the first frequency band.

As an example of operation, let us consider that a pure dual tone signal, one of the tones in the high frequency band and one in the low frequency band, is applied to the tone receiver at the subscriber's line 2. Let us also assume that the high frequency tone has been attenuated by the subscriber's line to a greater extent than the low frequency tone, as would normally be the case.

Automatic gain control 9 renders the dual tone signal to a predetermined amplitude, in which the ratio of the amplitude of the aforementioned two tones is about maintained.

The signal is then passed through bandpass filters 10A – 10D and 11A – 11D which separates the two tones. Let us say, for example, that the tone frequencies are such that the larger amplitude low frequency tone is passed through bandpass filter 10D, and the lower amplitude high frequency tone is passed through bandpass filter 11A. Alternating voltage signals are thus passed only to rectifier and smoothing filters 12D and 13A, and unidirectional voltages are presented at the trigger input ports of triggers 14D and 15A respectively.

The same unidirectional voltages are presented to diodes 18D and 20D, the higher amplitude voltage being amplified by inverting voltage amplifier 19, and the lower amplitude voltage by inverting voltage amplifier 21. The result is a triggering threshold control voltage at conductor 17 reduced from the normal positive voltage present thereat, and smaller in amplitude than the triggering threshold control voltage at conductor 16.

The substantially smaller triggering threshold control voltage at conductor 17 serves to decrease the triggering threshold of trigger circuits 15A – 15D, allowing, in the present example, trigger circuit 15A to be triggered, and thus provide a signal at output terminal 8E.

In a similar manner, the threshold control signal at conductor 16 will be increased from the normal positive voltage present thereat, and the trigger threshold of trigger circuits 14A – 14D is substantially increased, causing trigger circuit 14D to operate only upon the relatively greater unidirectional voltage passing the increased threshold voltage. Since the unidirectional voltage is indeed greater, an output signal at output terminal 8D is thus provided.

Accordingly, it may be seen that the see-saw function of the threshold control voltage generating circuit, the threshold control means, automatically causes compensation for the differences in amplitudes of the two tone frequencies as received by the receiver, in a proportional manner.

In the event signals other than the two tones just explained are present, and that signal energy is within the frequency bands passed by other bandpass filters, and is rectified and smoothed, such additional signals would be of such low amplitude due to their inherent energy spread and the small amount of energy within any one band width, that the logical OR circuit would operate only to give an output in response to the relatively higher amplitude tone frequency component. In addition, should the extraneous noise be present at a frequency which is adjacent the tone frequency and is therefore either passed by the proper signal tone bandpass filter or one adjacent in frequency response having overlapping band edges, the amplitude of such signals with respect to the centre portion of the bandwidth has been found to be so low as to cause rejection of the signal in the manner described above.

Figure 3:
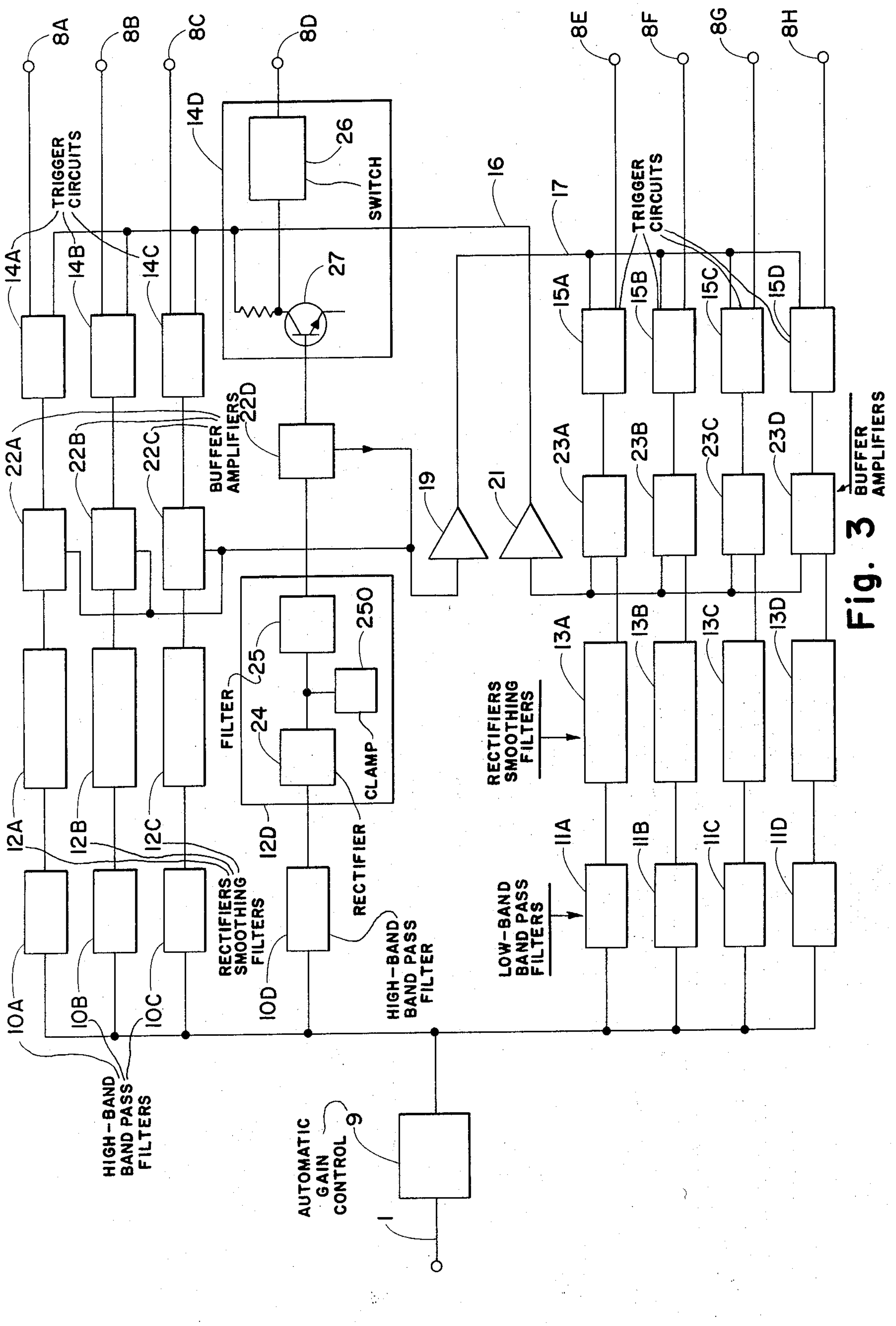
FIG. 3 is a block diagram representation of the present invention in more detail.
Figure 5:
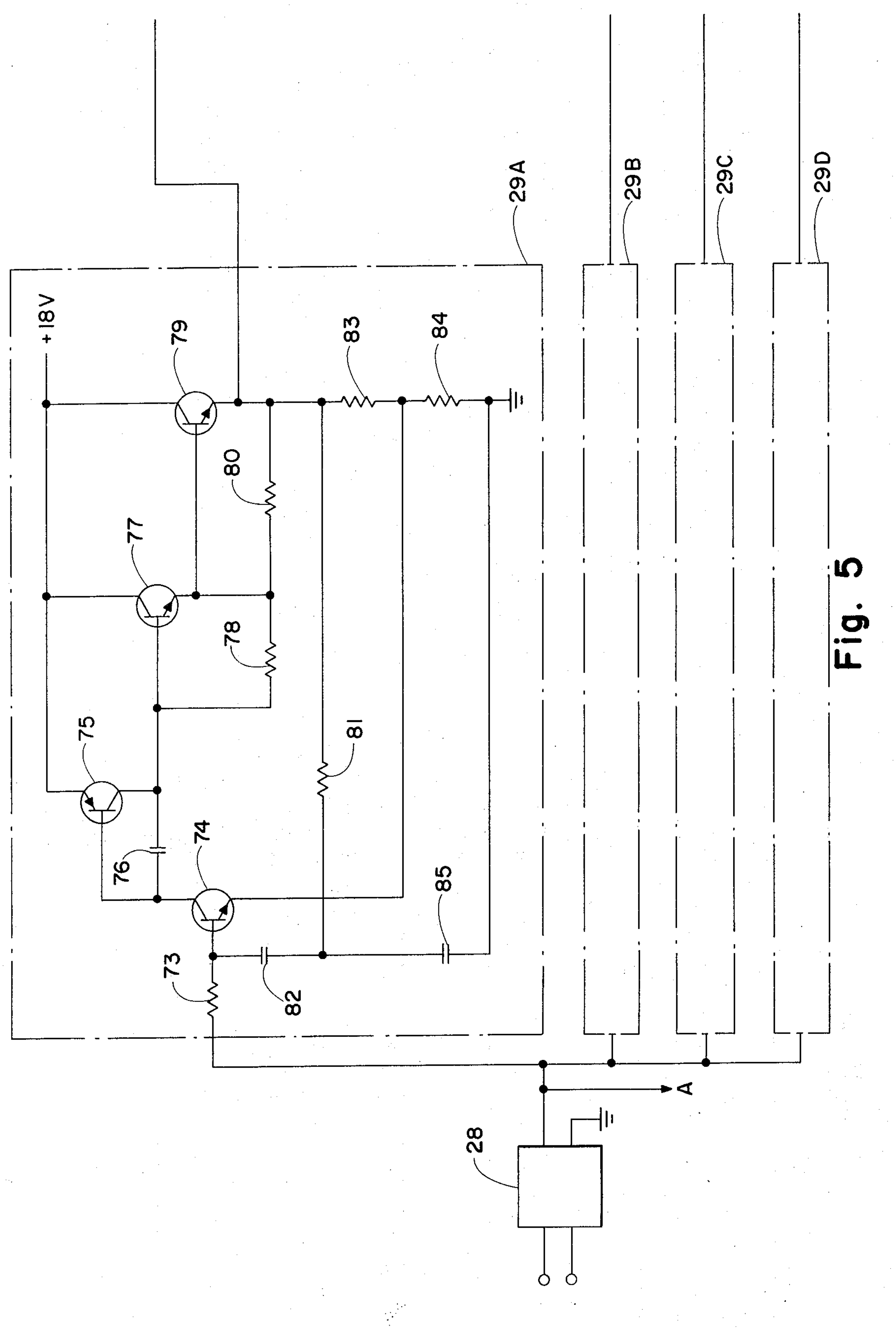
Figure 6:
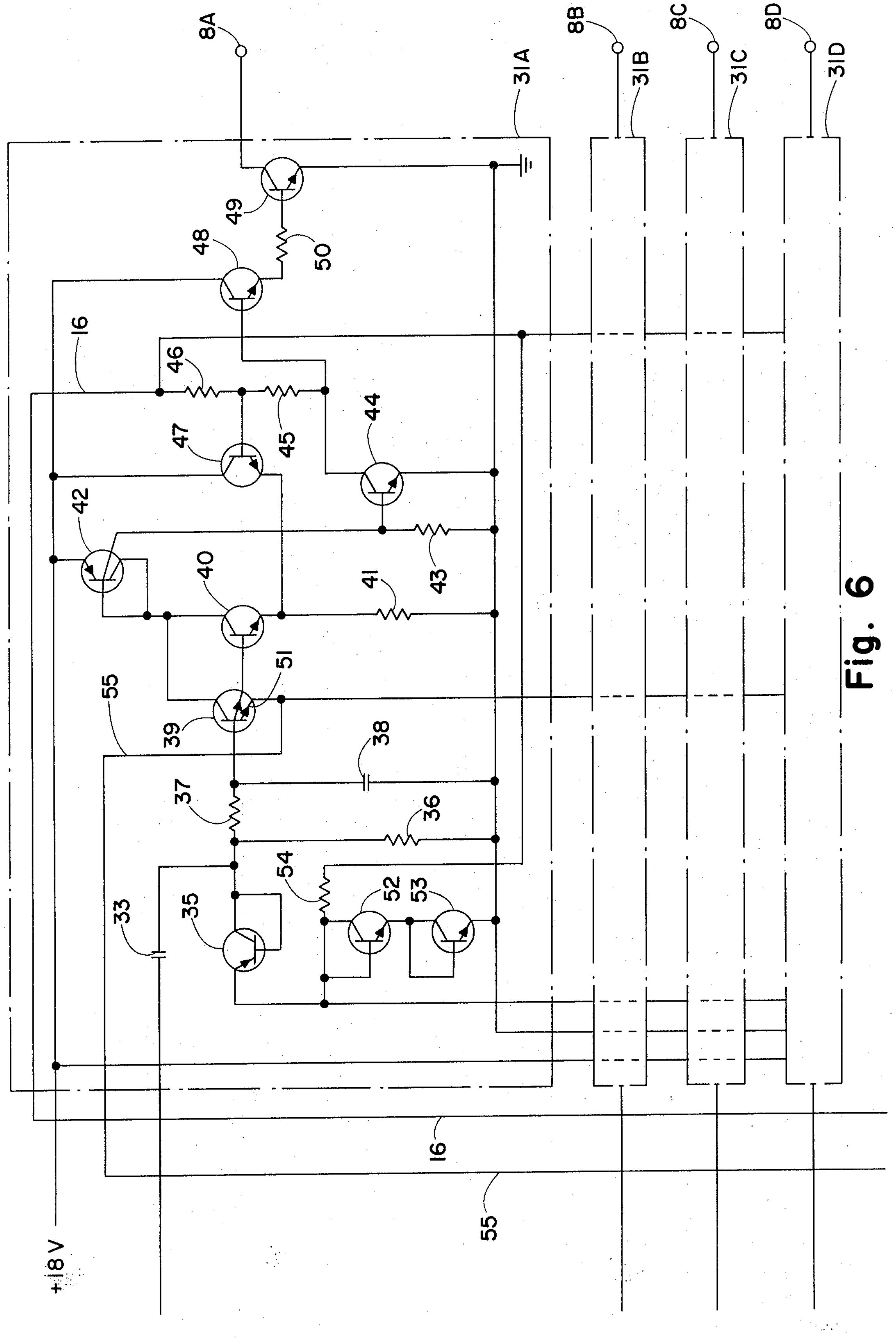
Figure 7:
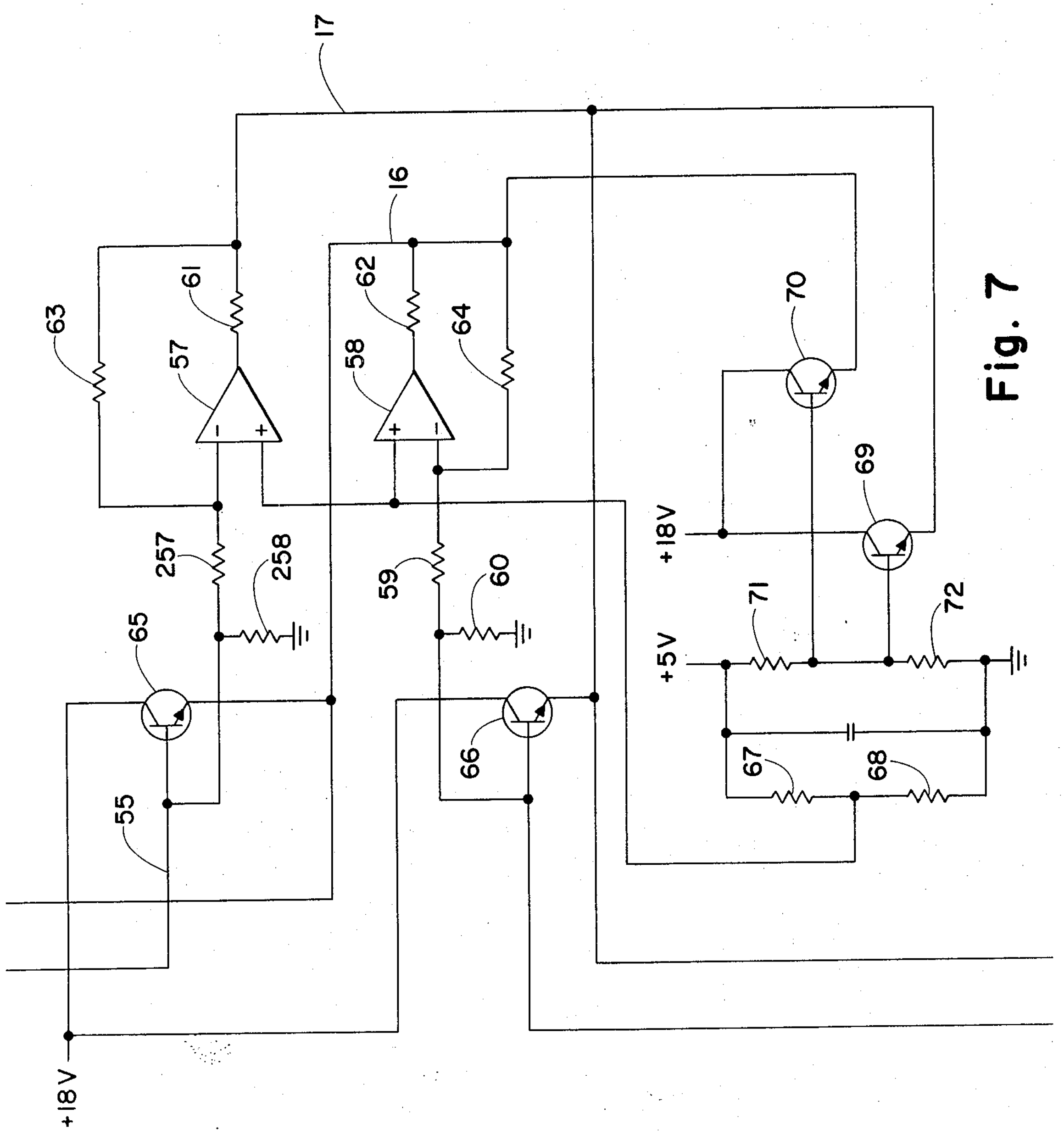
Figure 8:
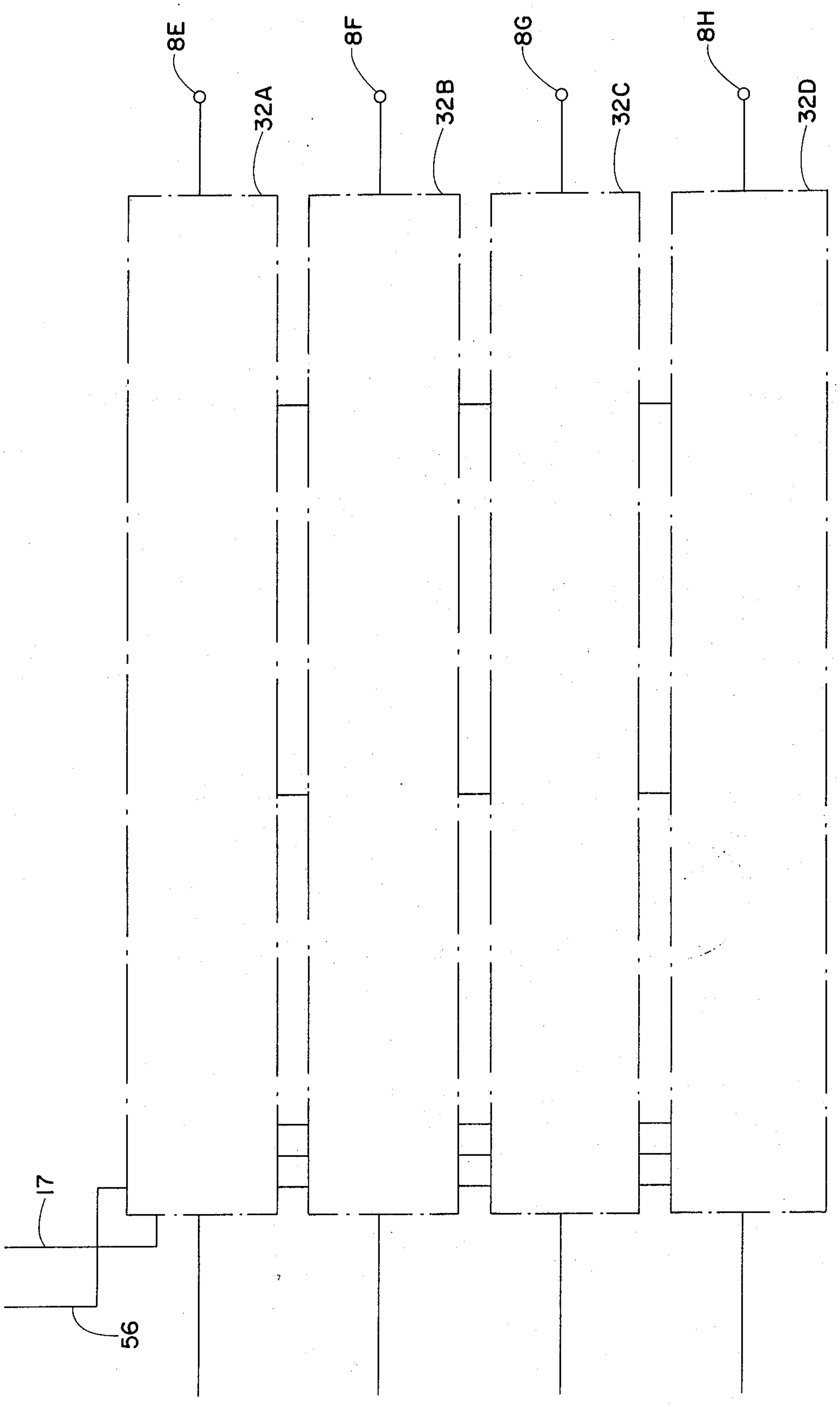
Figure 9:
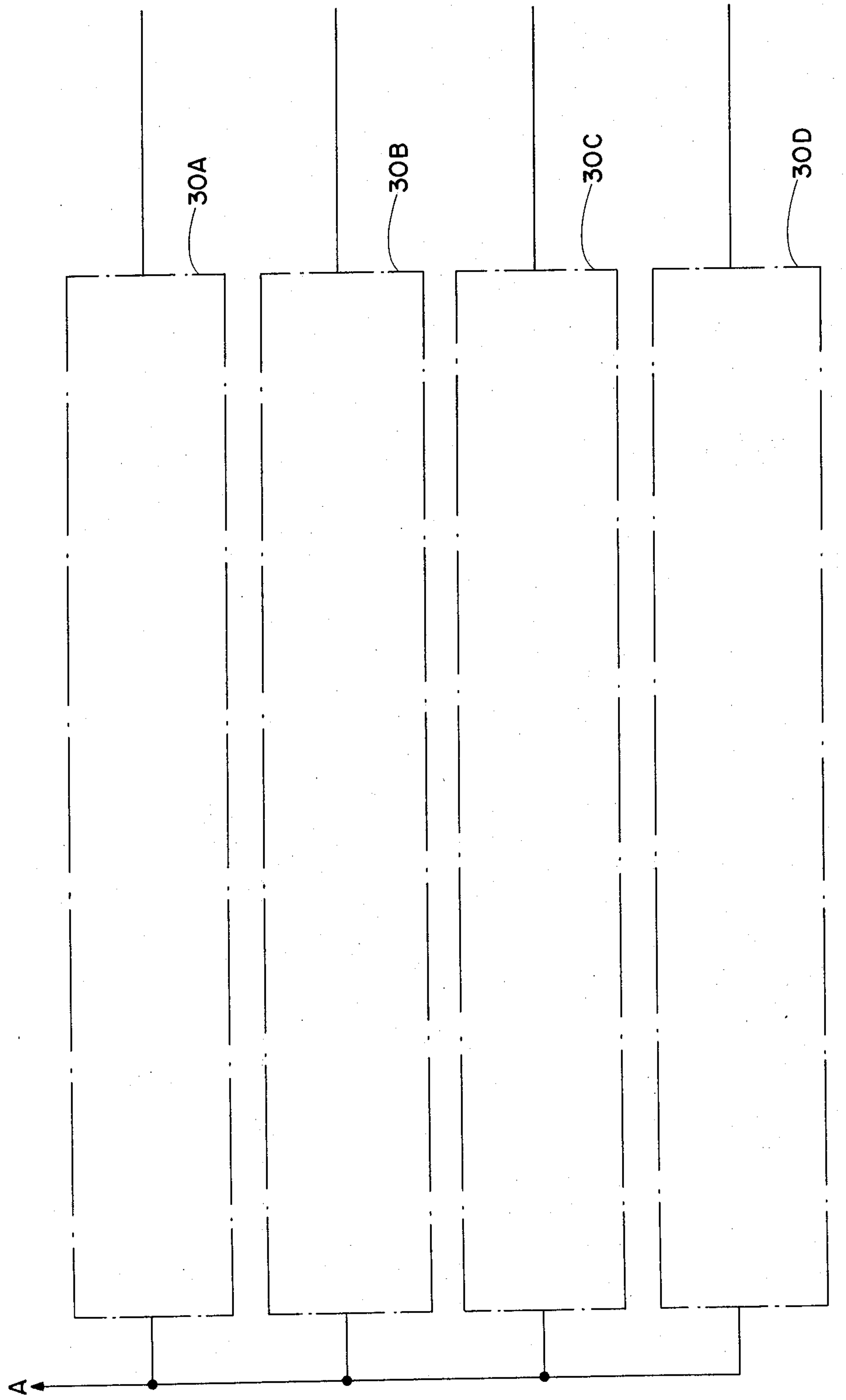

Turning now to FIG. 3, a block diagram of the dual tone receiver is shown in more detail. Here, the rectifier and smoothing filters, and trigger circuits have been expanded to show what they contain in more detail.

It may be seen that buffer amplifiers 22A – 22D have been respectively inserted in the signal paths between rectifier and smoothing filters 12A – 12D and trigger circuits 14A – 14D. Similarly, buffer amplifiers 23A – 23D respectively have been inserted in the signal paths between rectifier and smoothing filters 13A – 13D and trigger circuits 15A – 15D. The buffer amplifiers each provide a high impedance input to the output signal of the rectifier and smoothing filters, and contain the aforementioned logic diodes. Accordingly, each of the buffer amplifiers 22A – 22D is connected to the input circuit of voltage amplifier 19, while each of the buffer amplifiers 23A – 23D is connected to the input circuit of voltage amplifier 21.

Representative rectifier and smoothing filter circuit 12D has been shown in more detail. Here a rectifier 24 passes the signal applied by its preceding bandpass filter, to a smoothing filter 25, whereupon the rectified signal voltage is converted to a unidirectional voltage of about the same amplitude as the peak voltage of the alternating signal entering the rectifier. The unidirectional signal is then passed from the smoothing filter 25 to buffer amplifier 22D.

It is preferred to clamp the signal traversing the rectifying and smoothing filter, for instance, by clamp 250 at the junction of the filter and the rectifier, to a potential which cancels out the effect of diode threshold potential drops in the buffer amplifier, in order that the signal entering the buffer amplifier can be compared directly with the threshold control voltage affecting its associated trigger circuits.

Trigger circuit 14D is comprised of a transistor switch means 26, which has its input connected to the output circuit of a transistor 27. The output electrode, the collector, of transistor 27 is connected through a load resistor to the source of trigger threshold voltage, which leads to the voltage amplifier having its input connected to the circuitry related to the other band of frequencies.

In the event a signal passes through buffer amplifier 22D, it is applied to the input electrode of transistor 27. Transistor 27 will pass current only when the input signal is greater than the trigger threshold voltage in a manner to be described in more detail later in this specification.

Corresponding transistor 27 within trigger circuit 15A (not shown) will have a trigger threshold voltage applied to its collector which causes it to switch on at a relatively lower input signal voltage level. Accordingly, it may be seen that the trigger threshold level related to both bands of frequencies may be continuously adjusted, and each dependent on the relative maximum amplitude level of the opposite band of input signals.

FIG. 4, which appears on the same page as FIG. 1, depicts how FIGS. 5, 6, 7, 8, and 9 should be placed together to form a single drawing.

Turning now to FIGS. 5, 6, 7, 8, and 9 the automatic gain control circuit 28 is shown having a pair of signal input terminals to which a dual tone signal is applied. The automatic gain control circuit is connected to two sets of active filters, shown generally as blocks 29A, 29B, 29C, and 29D for the high frequency band signal processing circuitry, and 30A, 30B, 30C, and 30D for the low frequency band signal processing circuitry Individual selected alternating signals are then passed to the blocks generally containing the detector, smoothing filter, buffer amplifier, and trigger circuits, generally identified as blocks 31A, 31B, 31C, and 31D for circuitry processing the high frequency band signals, and 32A, 32B, 32C, and 32D for circuitry processing the low frequency band signals.

Turning now to representative block 31A, which has been realized using an integrated circuit chip, a thick film resistor module, and a thin film capacitor module, an alternating signal having passed through active filter 29A is presented to the rectifier through first capacitor 33, which in the embodiment to be described is usefully about 5 nanofarads. A rectifying diode 35, which usefully is fabricated in the form of a PNP transistor having a base to collector short, is connected between capacitor 33 and ground (through a clamping circuit to be described later). Accordingly, negative swinging portions of the input signal arriving through capacitor 33 are conducted to ground (or clamped to a predetermined voltage level). The rectifying diode 35 has the advantage of a high reverse breakdown voltage if fabricated as a PNP structure.

The signal is then passed through a smoothing filter comprising first resistor 36, usefully of between 1 and 3 megohms, and connected between capacitor 33 and ground, and second resistor 37 series connected with second capacitor 38, which is connected in parallel with first resistor 36. Second resistor 37 usefully is between 1 and 3 megohms and second capacitor 38 about 5 nanofarads.

First and second transistors 39 and 40 respectively are connected as a Darlington Pair, the emitter of the first transistor 39 being connected to the base of the second transistor 40, their collectors being connected together. The base of transistor 39 is connected to the junction of capacitor 38 and resistor 37. The emitter of the second transistor 40 is connected through third resistor 41 to ground, the latter resistor usefully having a value of about 10,000 ohms.

Transistors 39 and 40 shown as NPN transistors, and their associated circuitry thus form a buffer amplifier having a very high input impedance. Accordingly, it maybe seen that the unidirectional voltage presented to the input circuitry of the buffer amplifier at the base of transistor 39 is maintained at the level of the peak of the alternating voltage passing through first capacitor 33, plus any clamping voltage provided.

Connected to the collectors of first and second transistors 39 and 40 is the base of third transistor 42, the latter transistor being opposite in polarity type to transistors 39 and 40. Transistor 42 is fabricated having two collectors, one of the collectors being short circuited to the base. The emitter is connected to a source of supply voltage. Its collector is connected through a fourth resistor 43 to ground, the latter resistor having a value usefully of about 5,000 ohms, and functions as a load for transistor 42.

Connected to the collector of transistor 42 is the base of fourth transistor 44, which has its emitter connected to ground. Transistor 44 should be of the same polarity type as transistors 39 and 40. The collector of transistor 44 is connected through a load resistance comprised of fifth and sixth resistors 45 and 46, usefully of 7,000 and 3,000 ohms respectively, to a source of threshold control voltage, shown in this block as arriving via wire conductor 16.

The junction between resistors 45 and 46 is connected to the base of fifth transistor 47, which has its emitter connected to the emitter of transistor 40, and its collector to the source of supply voltage.

A transistor switch, comprised of sixth and seventh transistors 48 and 49 is connected from the base of transistor 48 to the collector of transistor 44, and from the collector of transistor 48 to the source of supply voltage. The emitter of transistor 48 is connected via a resistance of, for instance, 70,000 ohms, to the base of transistor 49, which has its emitter connected to ground. A logical output signal is obtainable at output terminal 8A which is connected to the collector of transistor 49.

Transistor 39 usefully contains a second emitter 51 which, with the base, forms the diode referred to earlier in FIG. 2 as one of diodes 18 or 20 and is used for providing a logical OR and the signal level to the see-saw threshold voltage control circuit.

It is preferred that the signal at the smoothing filter be clamped to a level such as to compensate for the base to emitter diode voltage drops in transistors 39 and 40. Accordingly, diodes 52 and 53, preferably manufactured as transisors having base to collector short circuits, are connected in series between the rectifying diode 35 and ground, in the same polarity sense as the base to emitter diodes of transistors 39 and 40. The junction point between the clamping diode 52 and rectifying diode 35 is connected via eighth resistor 54, which usefully is of about 10,000 ohms, to the source of trigger threshold voltage, as a convenient point.

It is preferred that only a single pair of clamping diodes be used within the group of circuits 31A – 31D, and therefore the junction between the clamping diodes and the rectifying diode will be connected to each of the rectifying diodes in each of the circuits in that group. A similar set of clamping diodes will be connected to each of the rectifying diodes in each of the circuits 32A – 32D of the other group.

In addition, since a single threshold output signal from each circuit group is desired, the second emitters 51 of each of the transistors 39 in each of the circuits 31A – 31D are connected together and to threshold output conductor 55, and the second emitters in each of the transistors 39 in circuits 32A – 32D will be similarly connected together and to threshold output conductor 56.

In operation, clamp diodes 52 and 53 provide a common bias point for the four circuits 31A – 31D at two diode threshold levels above ground. One of these threshold levels is lost through diode 35, and the junction of diode 35 and capacitor 33 thus is clamped at one diode threshold level above ground.

As the input signal swings below this potential level, it is conducted to ground, and the alternating voltage component of the remaining signal is removed by resistor 37 and capacitor 38, resulting in a unidirectional voltage at the base electrode of transistor 39 of one diode threshold potential level plus the peak voltage level of the input signal.

When a signal voltage appearing at the base of transistor 39 reaches one diode threshold drop above ground plus the trigger threshold control level applied at conductor 16, transistors 39 and 40 begin to conduct, turning on transistors 42 and 44. At this level, the peak voltage equals the trigger threshold control voltage, since there is one diode conduction threshold voltage level lost in the base to emitter diode of transistor 39, and the base to emitter diode of transistor 40 is compensated by the same of transistor 47. Accordingly, when the peak input signal to the rectifier is equal to or greater than the threshold control voltage, transistors 39, 40, 42, and 44 will begin to conduct, transistor 47 already being in a conducting state. It is therefore clear that clamping diodes 52 and 53 function to compensate for the diode potential drops encountered by the input signal, which causes a differential between it and the triggering threshold control signal.

Upon operation of transistor 44, the effective threshold voltage of the switching transistors 48 and 49 is reduced by about 30 percent due to resistors 45 and 46, tending to turn the former transistors off. This provides positive feedback to make the trigger switching action very sharp, and it also provides a hysteresis characteristic which is desirable to avoid toggling of the trigger circuit at the ripple frequency of the input signal, and to allow for short interruptions of the signal due to the effects of noise.

The response time of the detector portion of the circuit is controlled by the time constant of resistor 37 and capacitor 38. A slow attack characteristic is desirable to minimize simulation of one signals by voice. Clearly the longer that the signal is required to be present, the less the likelihood of a random simulation. Typically the trigger threshold control voltage is +5 volts, and the external voltage supply is +18 volts.

The high band group threshold control signal appearing on conductor 55 is passed to operational amplifier 57. Similarly, the low band group threshold control output signal is passed via conductor 56 to operational amplifier 58. Preferably, amplifier 57 and 58 are each comprised of Dual Frequency-Compensated Operational Amplifiers such as ML747 or ML1558, available from Microsystems International Limited of Ottawa, Canada, the former being described in Bulletin 22005 available from that company. Both of amplifiers 57 and 58 are available as the ML747 in a single dual-in-line package, having power supply positive and negative (ground) terminals (not shown in the present figures), a pair of input terminals marked − and +, and an output terminal. Conductors 55 and 56 are respectively connected to the terminals marked − in amplifiers 57 and 58, while the input terminals marked + are connected together.

Connected in series with conductor 55 is resistor 257 of about 300,000 ohms, conductor 55 also being connected through resistor 258, of about 300,000 ohms, to ground. Conductor 56 is connected to the input terminal of amplifier 58 via resistors 59 and 60 which are similar respectively to resistors 257 and 258. The output terminal of amplifier 57 is connected in series with resistor 61 and similarly the output terminal of amplifier 58 is connected in series with resistor 62, both resistors 61 and 62 being of about 3,900 ohms. The other end of each of the resistors 61 and 62 are respectively connected back to the input terminal marked − through resistors 63 and 64, each of the latter being of about 300,000 ohms.

The junction of resistors 61 and 63 provide a threshold control input signal to the circuits 32A – 32D of the other group, and in particular are connected to corresponding resistors 46 in each of the aforesaid circuits through conductor 17. Similarly, the junction between resistors 62 and 64 provides a trigger threshold control input signal to the circuits 31A– 31D of the first group and is applied thereto via conductor 16.

In the event the triggering control output signal from one circuit is very large, and the signal traversing the other band circuit very small, it is desirable to establish a level which would eliminate possibility of voice or noise signals triggering the trigger circuit due to unduly high sensitivity. Accordingly, eighth transistor 65 is connected with its base to threshold output conductor 55 of its associated group of circuits, and its emitter is connected to the trigger threshold control terminal conductor 16 of the same group. Its collector is connected to a source of supply voltage. In the event of the signal on conductor 16 dropping too low, transistor 65 will feed a portion of its own threshold control signal back to its own trigger circuit to establish a minimum threshold level. This prevents two trigger circuits in the same group from being actuated under unusual transient conditions: the input signal may possibly be temporarily increased above its nominal limited value.

Similarly, ninth transistor 66, connected in a similar manner to conductors 17 and 56, protects circuits 32A to 32D from similar effects.

In addition to the above protection, it is also desirable to set up a minimum triggering voltage for each of the triggering circuits. For this purpose, amplifiers 57 and 58 operate differentially, which differential voltage is provided by the input terminals marked + being connected to a voltage divider comprised of series resistors 67 and 68 connected between an appropriate voltage supply and ground. Connected to conductor 17 is the emitter of a 10th transistor 69, which has its base connected to the junction point of a pair of resistors 71 and 72 which is connected between ground and the same supply as is connected to resistors 67 and 68. Similarly, the emitter of eleventh transistor 70 is connected to conductor 16, and its base is connected to the junction of resistors 71 and 72. The collectors of transistors 69 and 70 are connected together to a positive supply voltage. Resistor 68 and 72 are each usefully about 20,000 ohms, while resistor 71 may be varied in order to set a minimum output voltage from the operational amplifiers 57 and 58. This resistor, in conjunction with resistor 72 should be adjusted to obtain a minimum output voltage on conductors 16 and 17 of between 2 and 4.5 volts. Resistor 67 in conjunction with resistor 68 sets the bias point of the amplifier typically at 4 – 5 volts.

Turning now to active filter circuit 29A, which is representative of filters 29B – 29D and 30A – 30D, this circuit has a Q of about 15, and is desirably fabricated using integrated circuits and thin film technology. It can therefore be automatically laser trimmed in a mass production mode, keeping its cost low and size small.

The dual-tone signal is received in common with all of the filter circuits at resistor 73. The signal then passes to the base of transistor 74 which has its collector connected to the base of transistor 75 which is of opposite polarity type to transistor 74. A capacitor 76 of about one picofarad is connected between the collector of transistor 75 and the collector of transistor 74. The collector of transistor 75 is further connected to the base of transistor 77 which has its collector connected to the emitter of transistor 75, and its own emitter connected through resistor 78 back to its own base. The emitter of transistor 77 is further connected to the base of transistor 79 which has its collector connected to the collector of transistor 77 and also to a source of supply voltage. The emitter of transistor 79 is connected to its own base through resistor 80, and also to the base of transistor 74 through the series arrangement of resistor 81 followed by capacitor 82. The emitter of transistor 79 is also connected to the emitter of transistor 74 thorugh resistor 83, and the emitter of transistor 74 is connected to ground through resistor 84. The junction between capacitor 82 and resistor 81 is connected to ground through capacitor 85.

Each of capacitors 82 and 85 usefully are 5.2 nanofarads, whie resistors 78, 80, and 81 are respectively about 40,000 ohms, 20,000 ohms, and 28,300 ohms, while resistors 83 and 84 are typically 2,860 ohms and 3,000 ohms respectively. Transistors 74, 77 and 79 are NPN, in this embodiment.

The above-described filter is particularly useful for the reception of tones generated in a telephone for transmission over an audio frequency telephone line, since it may be easily adjusted to Q and frequency. For instance, the value of resistor 73, while nominally set forth as being about 56,600 ohms, is the element which will adjust the centre frequency of the filter. Accordingly, during fabrication, one technique of adjusting the desired frequency band of the filter is to increase the value of resistor 73 until the desired centre frequency is reached, at which point trimming of that resistor is ceased.

Similarly, resistor 83 adjusts the Q of the circuit, and may be trimmed in a similar manner to increase the value until the Q is equal to 15. This figure is a well-known Sallen and Key active filter of the positive feedback resonant type, and therefore no further explanation is deemed necessary.

The emitter of transistor 79 forms the output port of the filter, and is connected to capacitor 33 of the detector circuit, previously described.

It should be pointed out that while the circuit and operation described above was directed to two bands of frequencies, one having all expected frequencies higher than all frequencies of the other, it should be recognized that this is not a strict requirement for operation, and the bandpass filters can be mixed as desired. In addition, the signals arriving from different sources than a telephone transmission line can be passed through the detector, trigger, and threshold control signal generating means in order to provide a result as described and would be expected from the description above. Indeed, the applied signals could be of the unipotential type, eliminating the requirement for the rectifiers and smoothing filter, as well as the bandpass filters.

While the disclosure set forth herein did not describe the automatic gain control circuit 28 in detail, as the invention simply requires a constant amplitude dual tone signal to be applied to the filters, should an automatic gain control circuit be required in the implementation of this invention, a suitable one is available as product code number ME8801, from Microsystems International Limited.

It is to be understood that the above-described arrangements are illustrative of the application of the principles of the invention. Numerous other arrangements may be devised by those skilled in the art without departing from the spirit and scope of the invention.

What is claimed is:

1. A dual tone receiver comprising:

a. means for receiving input signals having at least two different frequency tone components, b. means for translating said received tone components into individual signals having amplitudes bearing a proportional relationship to their individual amplitude components of the input signal, c. triggering means connected to the translating means for receiving said individual signals corresponding to the tone components, and for producing individual output signals of predetermined amplitude upon receipt of said individual signals having amplitudes above predetermined trigger thresholds, d. threshold control means connected to the translating means and to the triggering means adapted to produce a trigger threshold signal for lowering the threshold of the triggering means for the production of one output signal upon receipt of one tone component of one amplitude and of a relatively higher amplitude other tone component, and for raising the threshold of the triggering means for the production of said one output signal upon receipt of a relatively lower amplitude other tone component.

2. A dual tone receiver as defined in claim 1, comprising two groups of said translating means for translating two groups of tone signals each having a predetermined number of bandpass filters, all said filters having their signal input ports connected to the (a) means; and a similar predetermined number of rectifier and smoothing filter means, connected individually to the signal output ports of said filters, for converting each band pass filtered signal into a corresponding unipotential signal; a similar predetermined number of triggering means, connected individually to the rectifier and smoothing filter means for receiving individually said unipotential signals as triggering signals; the threshold control means comprising means for converting the two individual unipotential signals having the highest amplitudes of their respective groups into two triggering threshold control signals and applying each to the opposite group of triggering means whereby the triggering thresholds of the triggering means of each group is modified to the degree opposite that of the relative amplitudes of the unipotential signal of that group to the unipotential signal of the other group; further including output ports connected to the triggering means for providing a pair of output signals at individual output ports corresponding to the frequency of the largest amplitude single tone received in each of the two groups.

3. A dual tone receiver as defined in claim 2, in which the first group of translating means is adapted to translate the lowest frequency half of the input signals, and the second group of translating means is adapted to translate the highest frequency half of the received input signals.

4. A dual tone receiver as defined in claim 2, in which the means for receiving said input signals comprises automatic gain control means for translating received dual tone signals into signals having approximately constant amplitudes.

5. A dual tone receiver comprising:

a. input terminal means for receiving an input signal comprised of a pair of tone frequencies, b. means connected to the input terminal means for translating the input signal to one having a standard predetermined amplitude, c. a low frequency tone group and a high frequency tone group of bandpass filters each connected to the signal output port of the translating means for segregating individual ones of the received tone frequencies, d. rectifying and smoothing filter means connected to the output ports of each of the bandpass filters for translating each of the segregated tone frequencies into individual unipotential voltages, e. triggering means connected to the signal output ports of each of the rectifying and smoothing filter means for receiving the individual direct currents as triggering signals, and for providing individual output signals of predetermined amplitude at output terminals means, f. means also connected to each of the rectifying and smoothing means for obtaining a representation of the highest amplitude unipotential voltages resulting from each group of tone frequencies segregated by each group of bandpass filters, and for providing a low frequency group threshold signal and a high frequency group threshold signal, and g. means for applying the low frequency group threshold signal to a threshold control terminal of each of the triggering means indirectly connected to the high frequency group of bandpass filters, and applying the high frequency group threshold signal to a threshold control input terminal of each of the triggering means indirectly connected to the low frequency group of bandpass filters, whereby a raising of either of said threshold signals to an amplitude higher than the other lowers the triggering threshold of the triggering means of the other group of triggering means, and a lowering of either of said threshold signals lower than the other raises the threshold of triggering of the triggering means of the other group.

6. A dual tone receiver as defined in claim 5, in which each of the rectifying and smoothing filter means is comprised of means for receiving an alternating voltage from individual ones of the bandpass filters, for rectifying said voltage, and for filtering said voltage to obtain an unipotential voltage of about the peak voltage of the alternating voltage; further including a high input impedance buffer amplifier connected between each of the rectifying and smoothing filter means and each of the triggering means, each said trigger means comprising first transistor means connected through a resistor means to the threshold control input terminal for reception of the other group threshold signal, having its input connected to said buffer amplifier, and adapted to conduct in the event of passing of an unipotential voltage signal by said buffer amplifier; and transistor switch means having its input circuit connected to the output circuit of the first transistor means whereby its threshold of conduction is raised or lowered to the degree of conduction of the first transistor means.

7. A dual tone receiver as defined in group 6, further including means connected to the rectifying means for clamping the rectified alternating voltage to a level sufficient to compensate for potential losses caused by additive active element conduction threshold levels in said rectifying and triggering means and buffer amplifier effectively reducing the level of said unipotential voltage in comparison with the applied group threshold signal.

8. A dual tone receiver as defined in claim 7, further including a pair of group threshold signal output terminals; diode means connected between each of the buffer amplifiers and a group threshold signal output terminal associated with its respective group of buffer amplifiers, a pair of voltage amplifier means, each respective one connected between a group threshold signal output terminal and the threshold control input terminals of the triggering means of the other group.

9. A dual tone receiver as defined in claim 8, in which the voltage amplifier means is comprised of a differential amplifier, and further including means connected to the voltage amplifier means for providing a set-up voltage thereto, whereby an output signal is provided by the voltage amplifier means only upon the applied group threshold signal being greater in amplitude than that of the set-up voltage; the set-up voltage thereby providing a minimum trigger threshold voltage level.

10. A dual tone receiver as defined in claim 5, in which the (d), (e), (f), and (g) means is comprised of:

i. an input capacitor having one terminal connected to a bandpass filter;

ii. a rectifying diode connected between the other terminal and ground;

iii. a first resistor connected in parallel with the rectifying diode and with a second resistor and a second capacitor in series;

iv. a Darlington Pair of transistors having their collectors connected together, the first transistor having its base connected to the junction of the second resistor and the second capacitor, and its emitter connected to the base of the second transistor; the emitter of the second transistor connected through a third resistor to ground; the first transistor also comprised of an extra emitter;

v. a third transistor of opposite conduction polarity than the first and second transistors, and also comprised of an extra collector, having its extra collector connected to the base thereof and to the collector of the second transistor, and having its emitter connected to a supply voltage terminal; the normal collector of the third transistor connected through a fourth resistor to ground;

vi. a fourth transistor of similar polarity to the first and second transistors, having its base connected to the normal collector of the third transistor, its emitter connected to ground, and its collector connected through fifth and sixth series resistors to a group threshold input signal terminal;

vii. a fifth transistor of similar polarity to the first and second transistors, having its base connected to the junction of the fifth and sixth resistors, its emitter connected to the emitter of the second transistor, and its collector to said supply voltage terminal;

viii. a sixth transistor of similar polarity to the first and second transistors, having its base connected to the collector of the fourth transistor and its collector connected to the supply voltage terminal;

ix. a seventh transistor of similar polarity to the first and second transistors, having its base connected to the emitter of the sixth transistor, its emitter connected to ground, and its collector to a signal output terminal;

x. means connecting each of the group threshold signal input terminals of each of the (g) means in each individual group together, and each of the extra emitters of the first transistor means of the same groups together at a pair of group threshold signal output terminals;

xi. the rectifying diode being connected in the opposite polarity sense as the first transistor toward ground.

11. A dual tone receiver as defined in claim 10, in which the electrodes of each of the rectifying diodes within each individual group of rectifying means potentially closest to ground are connected together at a clamp terminal; and further including a pair of diode means connected in substitution for a direct connection of all the rectifying diodes in a group to ground, betweeen the clamp terminal and ground in the same polarity sense as the first transistor.

12. A dual tone receiver as defined in claim 11, in which the (f) and (g) means includes a pair of differential voltage amplifiers, each having a pair of input terminals and an output terminal, one input terminal of each of the differential voltage amplifiers connected to one group threshold signal output terminal; the other input terminal of each of the voltage amplifiers being connected together and to a source of set-up voltage; the output terminals of each of the differential voltage amplifiers being connected to the group threshold input terminal of the other group of triggering means from the group of which it is connected to the group threshold signal output terminal.

13. A dual tone receiver comprising:

a. means for receiving signals within two groups of predetermined frequencies, b. means connected to the (a) means for generating a pair of predetermined amplitude output signals at terminals corresponding to the highest amplitude of the predetermined frequencies received in each of the two groups, c. means connected between the receiving means and the generating means for increasing the actuation threshold of the generating means upon receipt of one of the signals in one of said groups when the amplitude of the highest amplitude signal in the other of said groups is less than the amplitude of the highest amplitude signal of the first of said groups.

14. A dual tone receiver as defined in claim 13, in which the (c) means further is adapted to decrease the actuation threshold of the generating means upon receipt of the signals of said one of said groups when the amplitude of the highest amplitude signal of said other of said groups is greater than the amplitude of the highest amplitude signal of said first of said groups.

* * * * *